United States Patent [19]

Fahrni et al.

[11] Patent Number: 5,063,962
[45] Date of Patent: Nov. 12, 1991

[54] APPARATUS FOR THE CONTROLLED VENTILATION OF ROOMS

[75] Inventors: Heinz Fahrni; Max Rüegg, both of Wald, Switzerland

[73] Assignee: Hesco Pilgersteg AG, Ruti, Switzerland

[21] Appl. No.: 556,533

[22] Filed: Jul. 20, 1990

[30] Foreign Application Priority Data

Jul. 21, 1989 [CH] Switzerland ............... 02720/89

[51] Int. Cl.$^5$ ............................................. G05D 7/00
[52] U.S. Cl. .................................. 137/487; 73/861.66
[58] Field of Search .......................... 137/486, 487.5; 73/861.66, 861.65

[56] References Cited

U.S. PATENT DOCUMENTS 4,344,330 8/1982 Renken ..................... 73/861.66

Primary Examiner—Alan Cohan
Attorney, Agent, or Firm—Ladas & Parry

[57] ABSTRACT

For the controlled ventilation of a room a duct portion (8) with a quantity control and measurement means is provided in the ventilating duct. The duct portion (8) surrounds a tubular hollow body (25) in the form of a flow body, which has two pressure measuring chambers (29, 30) arranged successively in the flow direction. They are provided with rows of openings (27, 28), which produce a connection to the flow cross-sections with different flow speeds. The quantity is measured by means of a differential pressure measuring device (20), which is connected by means of ducts (32, 33) to the pressure measuring chambers (29, 30). The apparatus has low flow losses and a low flow noise. As a result of its favorable flow guidance the apparatus can be positioned directly adjacent to branches of the ventilation duct.

5 Claims, 5 Drawing Sheets

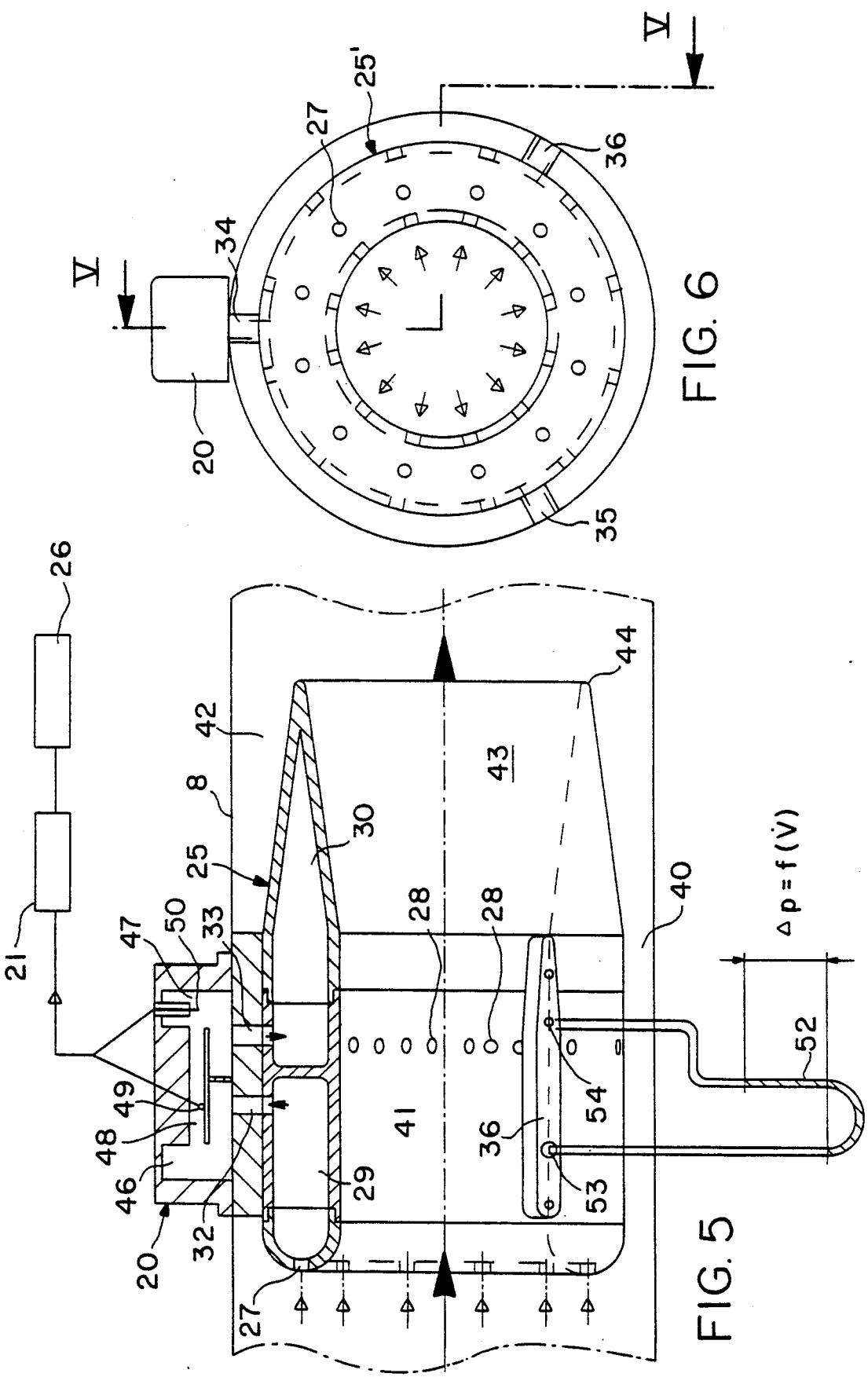

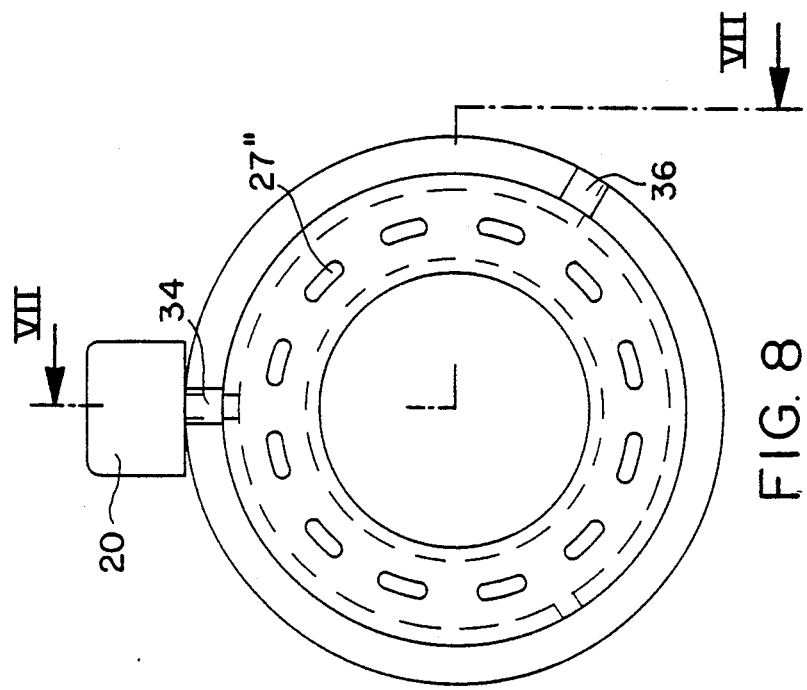
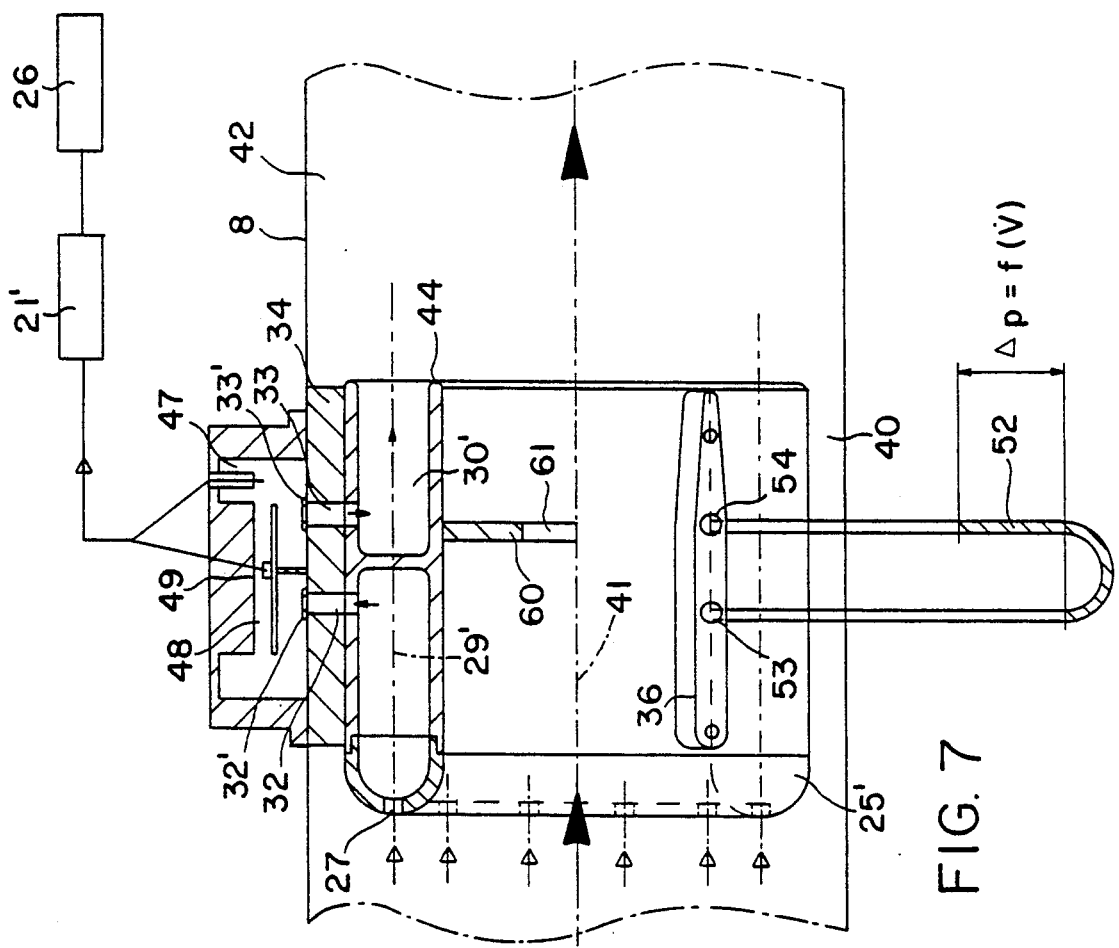

APPARATUS FOR THE CONTROLLED VENTILATION OF ROOMS

BACKGROUND OF THE INVENTION

The invention relates to an apparatus for the controlled ventilation of rooms, with a control member incorporated into a duct portion for constricting the flow cross-section in the duct portion, with a control drive for the control movement of the control member of a measuring device for measuring the flow quantity through the duct portion and with a controller located between the measuring device and the control drive and connected thereto, the measuring device having two measurement points succeeding one another in the flow direction for measuring a pressure difference decisive for the quantity measurement.

An apparatus of the aforementioned type positioned at a not defined point in a flow duct is e.g. known from EP-A-0 128 690. The production of the Venturi-type, constricted duct portion is complicated because the latter, like the complete duct wall for ventilation systems, must be made from heat-resistant material for safety reasons.

The problem of the invention is to provide an apparatus of the aforementioned type, which as a result of a favourable, uniform flow guidance permits a particularly accurate measurement and control, leads to low flow losses and which is constituted by a few, easily manufacturable parts. It preferably has a short size in the flow direction, so that it can in particular be incorporated into a ventilating system adjacent to the branch of a main duct or areas having a non-uniform flow.

SUMMARY OF THE INVENTION

According to the invention this problem is solved by a circular flow body constructed as a hollow body and fixed equiaxially and spacedly with respect to the wall of the duct portion and its transverse section in the flow direction has an elongated shape and which contains on the inflow side a pressure measuring chamber, which has on the ring area, against which flow takes place and which forms a dynamic pressure several pressure measuring openings arranged on a circular ring, the pressure measuring chamber being connected by means of a short duct to the measuring device and a second short duct connects the measuring device to a room located behind the pressure measuring chamber in the flow direction.

Advantageous developments of this solution form the subject matter of dependent claims.

BRIEF DESCRIPTION OF THE DRAWINGS

The invention is described in greater detail hereinafter relative to nonlimitative embodiments and the attached drawings, wherein show:

FIG. 5 A cross-sectional representation of a first embodiment of the apparatus along line V—V in FIG. 6.

FIG. 6 A view of the apparatus according to FIG. 5 in the flow direction.

FIG. 7 A cross-sectional representation of a second embodiment of the apparatus along line VII—VII in FIG. 8.

FIG. 8 A view of the apparatus according to FIG. 7 in the flow direction.

DETAILED DESCRIPTION OF THE PREFERRED EMBODIMENTS

Figure 1:
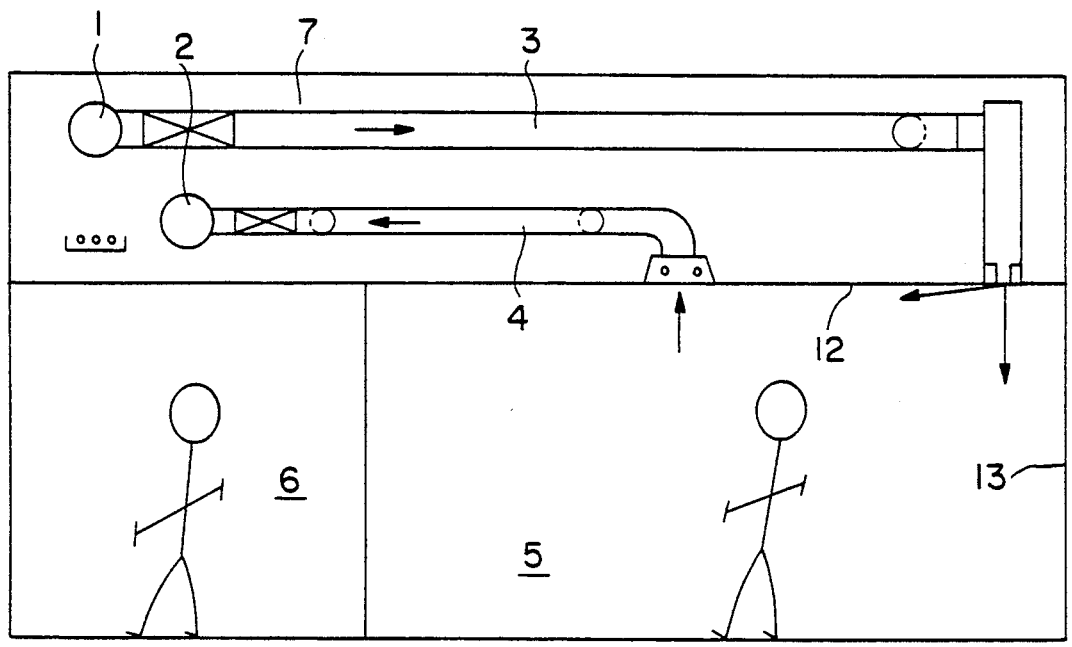
FIG. 1 A diagrammatic cross-sectional representation of part of a ventilating system.
Figure 2:
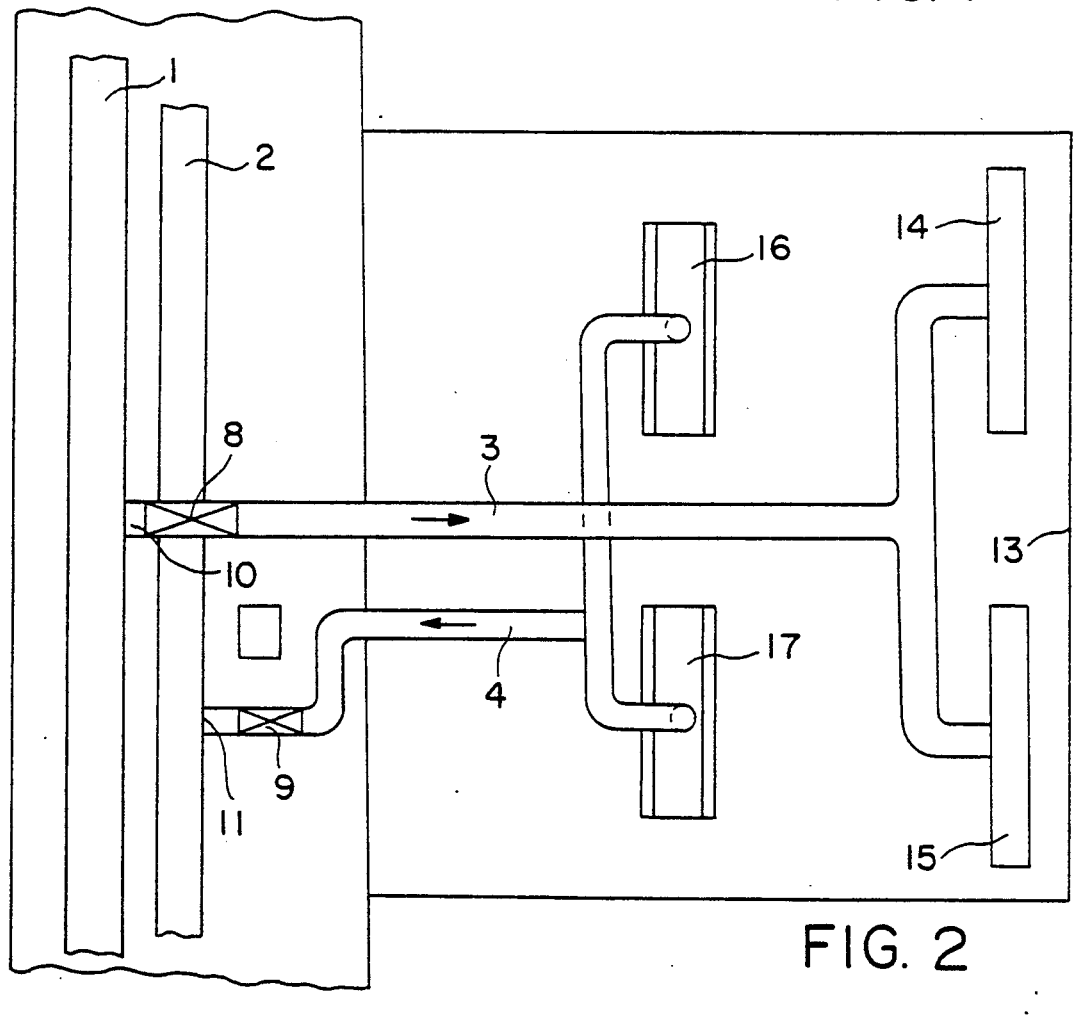
FIG. 2 A plan view of the system part according to FIG. 1.

FIGS. 1 and 2 diagrammatically show the conventional arrangement of main lines 1, 2 and branch lines 3, 4 of a system for the ventilation of rooms 5. These two inflow and outflow main lines 1, 2 are normally carried in a building supply duct 7 running above the corridor 6. Preferably an apparatus 8, 9 is incorporated into each branch line, i.e. in both flow directions. For an easier arrangement which is not prejudicial to the internal architecture, as well as for avoiding noise conduction to the rooms 5, said apparatuses 8, 9 are preferably installed adjacent to the branches 10, 11 and together with the main lines 1, 2 within the supply duct 7.

In the represented embodiment the air is introduced into the room 5 by means of air outlet boxes 14, 15 located in the ceiling 12 and in the vicinity of the window 13 and removed via air suction openings combined with the ceiling lights 16, 17.

Figure 3:
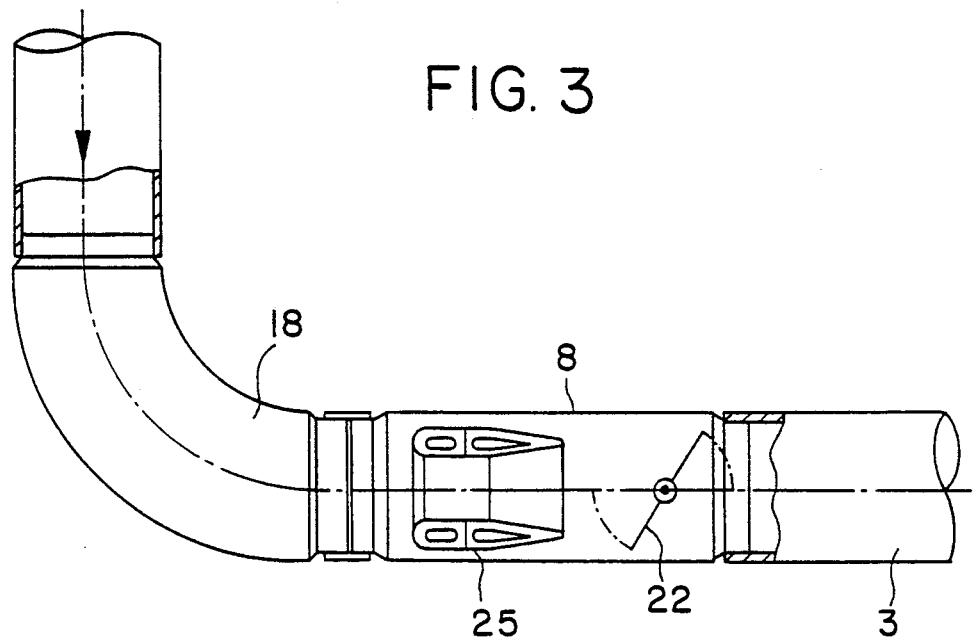
FIG. 3 An installation example of an inventive apparatus on an arcuate duct branch.
Figure 4:
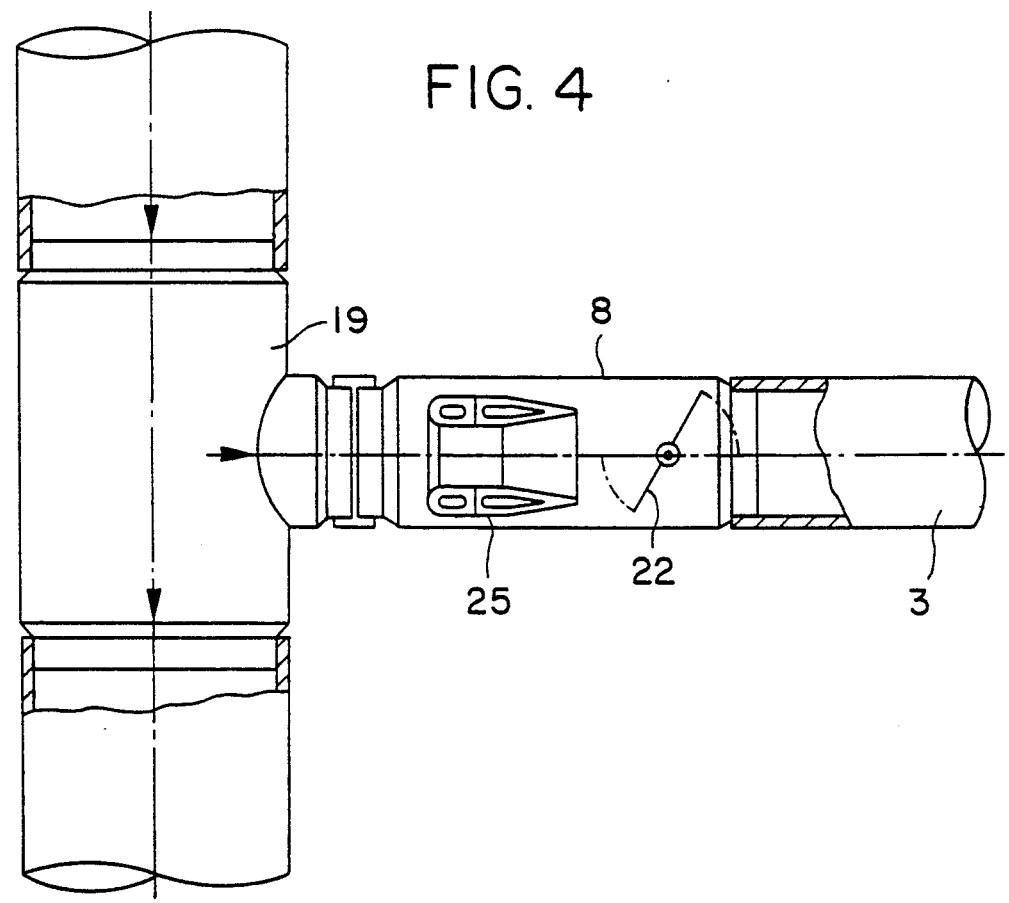
FIG. 4 An installation example of an inventive apparatus on a T-shaped duct branch.

The construction of branches 10, 11 in the form of a pipe bend 18 or in the form of a T-piece 19, as well as the installation and arrangement of the control apparatuses 8, 9 in the branch lines 3 are shown more clearly in FIGS. 3 and 4.

On the basis of the flow deflection at the branches 10, 11 the flow profile adjacent to the said branches is non-uniform. Thus, when positioned in the vicinity of the branches 10, 11, the known control apparatuses function imprecisely and more particularly as a result of a strong dependence on the location point in non-uniform flow profile.

In accordance with a per se known measuring principle by means of a pressure gauge 20 the pressure difference decisive for the flow quantity is measured between two flow points succeeding one another in the flow direction at the flow body 25. The measurement signal of the pressure gauge 20 is supplied to a controller 21, 21', 21", 21''', through which a control member, e.g. the control flap 22 or an axially adjustable closing body 23, 24 is moved by means of a control drive 26, 26', 26", 26''' into the position corresponding to the desired flow quantity.

In order to avoid measurement variations, which would be possible as a result of a non-uniform flow profile in the circumferential direction, the pressure difference is measured not only at individual circumferential points, but as a mean value between numerous circumferential points, in that at each measuring area several uniformly circumferentially distributed small pressure measure openings 27, 28, 28' arranged in rows lead into in each case one of two pressure measuring chambers 29, 30, 30' within the flow body 25, 25' and between which the pressure difference decisive for the flow quantity is measured by means of the pressure gauge 20.

The connection between the pressure measuring chambers 29, 30, 30' and the pressure gauge 20 fixed externally to the duct portion 8 takes place by two short ducts 32, 33, which extend through one of preferably two webs 34, 35, 36 shaped as flow bodies and which are kept by the flow bodies 25, 25' at a uniform distance from the duct portion wall. Through the arrangement of only two webs 34, 35 (FIG. 8) fixed to the flow body 25', the latter together with the same can be more easily inserted in a duct portion having flow cross-section-constricting reinforcing grooves or the like.

A construction as a flow body means that its flowed-round longitudinal cross-section has a flow-favourable configuration. For this purpose it has a transverse section which is rounded on the inflow side and elongated.

Figure 9:
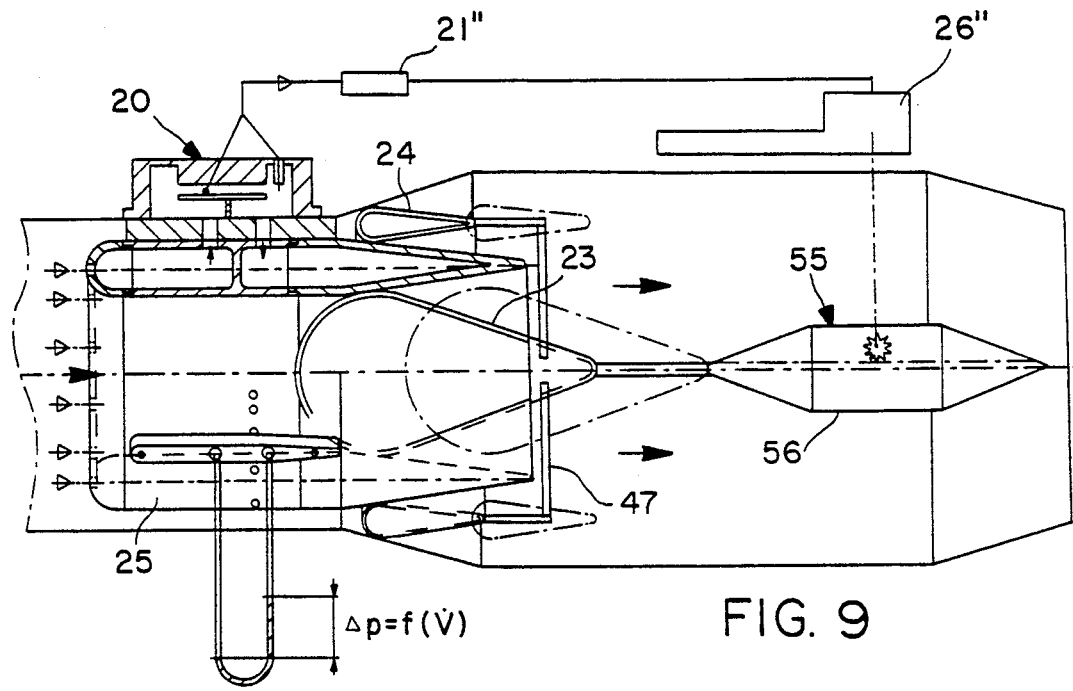
FIG. 9 A cross-sectional representation of a third embodiment of the apparatus.
Figure 10:
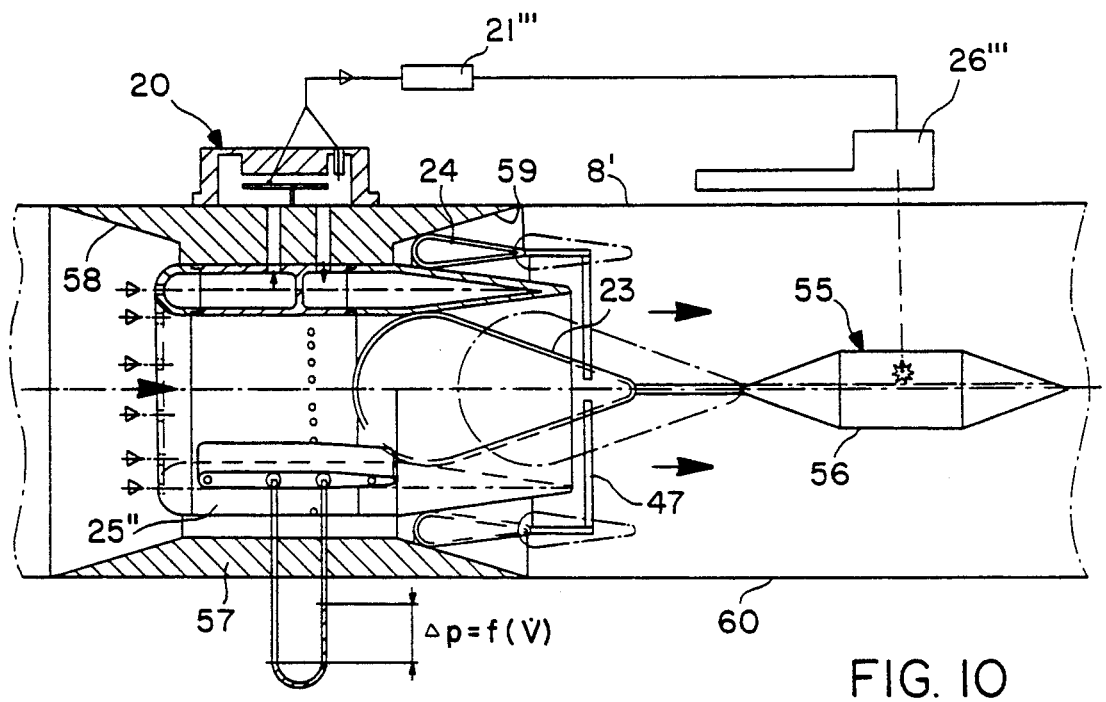
FIG. 10 A cross-sectional representation of a fourth embodiment of the apparatus.

In the embodiments of FIGS. 5, 9 and 10 the measurement of the air quantity flowing through the duct portion 7 is based on the measurement of the pressure difference at the openings 27 in the end face of the flow body compared with the lower pressure present in the outer and inner constricted flow regions 40, 41 or at the holes 28 arranged in rows there. However, in the embodiment of FIGS. 7 and 8 the pressure difference is measured at said frontal openings 27 compared with those at the outflow end 44 of the flow body, in that the pressure chamber 30' is open to the rear. This embodiment leads to lower flow noise, because the smooth outer surface of the flow body 25' is not broken by openings 28. In addition, said flow body 25' is particularly easy to manufacture and extremely flow-favourable.

The differential pressure measurement can take place on the basis of different measuring principles. In the present embodiment the flow connection between the two pressure measurement chambers 29, 30, 30' is through the measuring gauge 20 and in the latter there is a speed measurement according to the hot wire principle, because as a result of the pressure differences between the pressure measuring chambers 29 and 30, there is a correspondingly variable air flow through the pressure gauge 20. A speed measurement sensor 49 determines the speed in the narrower flow channel 48 of the pressure gauge 20 and its signal is related to that of a temperature sensor 50 in the widened area 47 of the pressure gauge 20. The non-linear speed signal is linearized in the regulator 21, compared with the desired value and evaluated as a control variable for the control member, e.g. a control flap 22. Through suitable nozzle inserts 32', 33' in the short ducts 32, 33, the flow quantity through the pressure gauge 20 can be adapted thereto.

A second measuring means is ued for testing the ventilating system, in that by random connection of an easily readable measuring device 52, e.g. a U-tube, the air quantity flowing in the room 5 can be determined for the differential pressure measurement between two pressure measuring chambers 29, 30, 30' of the flow body 25, 25'. This is possible on the basis of a relationship between the differential pressure and the through-flow quantity of the control apparatus 8, 9 known in connection with the latter. For this connection possibility of a second measuring means in a second web 36 holding the flow bodies 25, 25', 25" are provided two short connecting ducts 53, 54 with not-shown, closable connecting pieces, which are accessible from the outside of the duct portion 8, 9. The use of a per se known control flap 22 leads to a particularly low pressure loss when the control apparatus 8, 9 is fully open.

According to the embodiments of FIGS. 9 and 10 an axially adjustable inner and outer closing body 23, 24 is provided for quantity control and they are firmly interconnected by a common frame 54, so that they can be jointly moved by the control drive 26", 26''' via the control mechanism 55. For a low flow loss and a low flow noise the inner closing body 23 is tear-shaped and the outer, annular closing body 24 has a tear-shaped cross-section. The control mechanism 55 e.g. having a rack drive also has a casing 56 constructed as a flow body.

The flow bodies 25, 25', 25" and also the closing bodies 23, 24 can be made from plastic by deep drawing or as injection moulded parts, because they are arranged within the sheet metal duct portion.

The constriction of one area of the duct portion 8', also in combination with the tubular flow body 25", can be brought about by a nozzle body 57 tightly connected to the duct wall 56 and spacedly surrounding the same. Thus, the tubular flow body 25" has a smaller diameter. At its two ends, the nozzle body 57 has inner faces 58, 59 narrowing conically towards its center. The outflow-side inner face 59 forms with the area of the flow body 25" located there a V-shaped cross-section, in which engages the outer, annular closing body 24.

So that also with a relatively low flow rate against the flow body in the duct portion 8 of e.g. 3 m/sec instead of 10 m/sec the flow round it takes place at a speed giving an advantageous pressure gradient for an accurate quantity measurement by means of measuring device 20, interchangeable inserts can be fixed in the flow body 25', so as to constrict its internal flow cross-section. In the embodiment shown in FIG. 7 they are in the form of a perforated disk 60 with a through-flow opening 61 of suitable size and pressed into the slightly conical inner channel of the flow body 25'. Instead an axially longer body can be provided, whose axial cross-section corresponds to a venturi.

What is claimed is:

1. An apparatus for controlling the volume of air delivered through a duct to a room, comprising:
    (a) a control member for regulating the air flow cross section of a duct;
    (b) a control drive to control the movement of said control member;
    (c) a flow body, said flow body comprising a pair of axially concentric hollow cylinders, each with an edge upstream of the direction of air flow and a downstream edge, said hollow cylinders connected together at their upstream edges by a convex ring-shaped wall, a ring-shaped partition wall disposed between said pair of hollow cylinders intermediate said downstream and upstream edges, said convex wall and said partition wall defining a first pressure chamber, the volume downstream of said partition wall between said pair of hollow cylinders defining a second pressure chamber, said convex wall of said first pressure chamber having a plurality of intake apertures defined therethrough to communicate with said first pressure chamber, said second pressure chamber being at least partially opened between said downstream edges of said pair of hollow cylinders; and
    (d) a measuring device connected by air tunnels to said first and second pressure chambers, said measuring device having an air flow passage passing therethrough and communicating with said air tunnels, said measuring device measuring air flow rates through the duct by measuring said pressure differences between said first and second pressure chambers, wherein said measuring device directs said control device to operate said control member, thereby allowing the volume of air delivered through the duct to be regulated.

2. The apparatus of claim 1, wherein said plurality of intake apertures defined on said convex wall of said first pressure amber are in the form of slots.

3. The apparatus of claim 1, where said second pressure chamber is completely open at said downstream edges of said pair of hollow cylinders.

4. The apparatus of claim 1, wherein said flow body is positioned at a uniform distance from the walls of the duct in which it is located by a plurality of webs, at least one of said webs having said air tunnels passing therethrough.

5. The apparatus of claim 1, wherein said first and second pressure chambers have two auxiliary tunnels for connecting to a testing device for measuring air pressure differences between said first and second pressure chambers, said two auxiliary tunnels passing outside of said duct.

* * * * *